(12) United States Patent
Bernardy (10) Patent No.: US 7,171,798 B1
(45) Date of Patent: Feb. 6, 2007

(54) ROTARY SHREDDING BLADE

(76) Inventor: Eckhard Bernardy, 11017 NE. 124 Ave., Vancouver, WA (US) 98682-1624

( * ) Notice: Subject to any disclaimer, the term of this patent is extended or adjusted under 35 U.S.C. 154(b) by 1794 days.

(21) Appl. No.: 09/035,936

(22) Filed: Mar. 2, 1998

(51) Int. Cl.
*A01D 34/52* (2006.01)

(52) U.S. Cl. .......................................... 56/295; 56/255

(58) Field of Classification Search .................. 56/255, 56/295, DIG. 17, DIG. 20; 30/347, 276; 83/837, 835
See application file for complete search history.

(56) References Cited

U.S. PATENT DOCUMENTS

| | | | |
|---|---|---|---|
| 877,799 A * | 1/1908 | Rider | |
| 2,659,398 A * | 11/1953 | Marvin | |
| 2,976,666 A | 3/1961 | Machovec | |
| 3,059,400 A | 10/1962 | Plummer | |
| 3,078,573 A | 2/1963 | Kern | |
| 3,176,455 A * | 4/1965 | Buchanan | |
| 3,336,737 A | 8/1967 | Belfiore | |
| 3,338,039 A | 8/1967 | Nightingale | |
| 3,346,955 A | 10/1967 | Beneke | |
| 3,482,380 A | 12/1969 | Stair | |
| 3,521,684 A * | 7/1970 | McRobert et al. | |
| 3,781,991 A | 1/1974 | Stretton | 30/276 |
| 3,975,891 A | 8/1976 | Gunther | 56/295 |
| 4,062,171 A | 12/1977 | Rose | 56/295 |
| 4,083,166 A | 4/1978 | Haas | 56/13.7 |
| 4,250,622 A | 2/1981 | Houle | 30/347 |
| 4,300,336 A | 11/1981 | Miyata | 56/295 |
| 4,302,878 A | 12/1981 | Bonforte | 30/347 |
| 4,310,999 A | 1/1982 | Onoue | 56/295 |
| 4,362,007 A | 12/1982 | Kennedy et al. | 56/295 |
| 4,368,610 A | 1/1983 | Aono | 56/295 |
| 4,527,382 A | 7/1985 | Aono | 56/295 |
| 4,769,977 A | 9/1988 | Milbourn | 56/15.2 |
| 4,890,448 A | 1/1990 | Doi | 56/255 |
| 4,893,457 A | 1/1990 | Castain | 56/295 |
| 4,922,791 A | 5/1990 | Pinney | 83/840 |
| 4,938,012 A | 7/1990 | Klima | 56/295 |
| 5,056,605 A | 10/1991 | Bond | 172/111 |
| 5,167,109 A | 12/1992 | Meinerding | 56/295 |
| 5,197,268 A | 3/1993 | Barrera | 56/255 |
| 5,361,570 A | 11/1994 | Bernardy | 56/255 |
| 5,875,700 A | 3/1999 | Powell | |

FOREIGN PATENT DOCUMENTS

| | | | |
|---|---|---|---|
| CA | 2209054 | 7/1997 | |
| GB | 2144314 A | 3/1985 | 56/255 |

* cited by examiner

*Primary Examiner*—Meredith C. Petravick (57) ABSTRACT

A brush cutter blade for shredding of grasses, weeds, vines and brush and also for saw cutting of saplings and tree branches, comprising a circular saw blade member with auxiliary cutting elements projecting from the underside of the blade. Several preferred embodiments include semielliptic and rectangular structures and serrated and non-serrated cutting edges for the auxiliary cutting elements. All embodiments share outwardly sloped, substantially flat structures, circularly and symmetrically disposed, with centrally inclined base lines. This combination of structural features is enacted upon by centrifugal forces during rotation, to create an effective self-cleaning mechanism, whereby cutting debris is urged upward, outward and away from the auxiliary cutting elements.

18 Claims, 1 Drawing Sheet

ROTARY SHREDDING BLADE

BACKGROUND

1. Field of Invention

This invention relates to brush cutting and shredding blades for motorized, hand operated, brush cutters.

2. Description of Prior Art

Since the invention of the motorized, hand operated brush cutter several decades ago, many different blade attachments have been designed. Differences are reflected in structural variations, materials selected and in consequent functional characteristics. The objective of this application is to present structurally unique blades with enhanced operator safety, an improved shredding capability and with features which economize both manufacturing and reclaiming.

Existing blade designs can be conveniently categorized into three main structural and functional groups:

The first and least sophisticated of these relies on bar type structures which typically produce low frequency, flailing actions, resulting in shattering rather than true cutting of ligneous material. This type of blade also scatters debris widely and with the engagement of heavier woody substances, such as branches or small tree trunks, effective performance dramatically diminishes or stops altogether. Furthermore, there is a notorious sensitivity to imbalance with transmittal of resultant vibrations (and annoyance) promptly to the operator.

The second group is based on disk type structures. The traditional saw disk produces excellent smooth and efficient radial cutting. However, ordinary disk blades cannot function axially and are generally completely useless for shredding purposes.

The third group is relatively new and utilizes a disk element but with added Axial Cutting Elements. This type of blade effectively retains the undisputed superior cutting capability of orthodox disk saw blades, but the auxiliary Axial Cutting Elements also provide cutting axially. The unique combination of both radial and axial cutting capability allows an operator to respond to many different work requirements found in the field. This type of blade is the most effective and versatile brush blade known.

SPECIFIC EXAMPLES—PRIOR ART

A very good example, illustrating bar type designs, is found in the U.S. Pat. No. 4,938,012, to Klima (1990). This invention features a simple bar and all of the inherent limitations of such structures, such as flailing, debris scattering and inefficiency with relatively heavy material, etc. already defined and ascribed to the genre above.

Bonforte, with U.S. Pat. No. 4,302,878 (1981) had earlier achieved better effectiveness with a star shaped tri-element blade. More cutting elements lead to greater rapidity of engagement (by 30% over Klima) and these, although primarily radial, can be applied somewhat axially. Wide acceptance of this type of blade over many years, attests to its usefulness—or to the lack of a better blade, because this design is still restricted to relatively light ligneous material. The blade cannot cut readily through heavier branching nor small tree trunks. Also sensitivity to imbalance and propensity to widely scatter cutting debris persist.

A closely related additional example is offered by Stretton, et al, in U.S. Pat. No. 3,781,991 (1971) with three or more blade portions radiating from a central hub. Usually, the greater the number of blade portions or cutting elements, the smoother the cutting engagement. The inescapable drawback however, is that any axial cutting capability diminishes, as more and more radial cutting elements are deployed. The blade then rapidly approaches the common, radially serrated disk saw blade—with virtually no axial cutting capability, as the flat central hub blocks axial deployment.

U.S. Pat. No. 4,250,622, to Houle (1981), shows a design well on the way toward becoming, in effect, a traditional saw disk. Tooth structure variations make little difference and the proposed use of elastomers diminishes heavy duty efficiency even more.

Aono, with U.S. Pat. No. 4,368,610 (1983), resourcefully transformed disks to flats with undulating peripheral serrations. Here some axial cutting as well as radial cutting are possible. But the blade remains flat and thus severely limited in any axial application. Also, the staggered, undulating peripheral cutting elements compromise the traditional smoothness of an orthodox disk blade. Thus the Aono blade appears relegated to ripping actions on a largely radial plane.

Aono's UK Application, GB 2 144 314 A (1985), is yet another disk variant, little different from U.S. Pat. No. 4,368,610. This time, serrated peripheral cutting elements provide radial cutting—in both directions. But effective axial shredding is not achievable with the flat configuration alone.

Barrera's U.S. Pat. No. 5,197,268 (1993) presents a lawn mower blade combining a serrated disk hub with a radially protruding, single bar structure. Lawn mowing is a field substantially removed from brush cutting, except that power driven cutting implements are used for both. But the types of materials cut are dramatically different, as grasses share little with small tree trunks and therefore the design requirements vary greatly.

Use of the Barrera design on a high speed brush cutter will yield essentially performance to be expected from all other bar type cutters—with all the above stated deficiencies, as the inset hub serrations would be effectively prevented from making useful cutting contact. The bar would strike always first and the inset disk structure is ineffective axially.

A brush cutter blade ascribed to Pinney under U.S. Pat. No. 4,922,791 (1989) is disk based with chain saw type peripheral cutting elements. This almost pure disk design can lay little, if any, claim to axial cutting. There are only minor axial protrusions and the flat disk surface prevents axial engagement.

U.S. Pat. No. 3,338,039 to Nightingale (1967) presents a rotary blade with axially disposed, cupped, cutting elements intended for grass and lacking radial cutting elements. The omission effectively precludes sawing, but is of little consequence for lawn mowers and the inventor had grass in mind and not branches or saplings.

Kern's U.S. Pat. No. 3,078,573 (1963) features axial cutting elements raised in the form of unserrated pleats. No radial cutting elements are in evidence and consequently sawing on a radial plain is impossible.

U.S. Pat. No. 5,056,605, granted to Bond et al, (1991) illustrates a disk based multipurpose cutting device having biaxially disposed cutting elements. Since the cutting elements are projecting in both axial directions, sandwiching or 'piggy back' mounting on an auxiliary disk is not envisioned and without radial cutting elements of some other kind, the device only provides for axial applications.

Another U.S. Patent is granted to Meinerding under U.S. Pat. No. 5,167,109 (1992) and puts forth a blade designed for fine mulching of lawn grasses. Again all cutting elements are axially disposed, albeit this time in wedge configurations. No radial cutting elements are displayed, nor needed for this application. Brush and sapling cutting was apparently not envisioned and the blade is not effective for such activity.

Still another rotary mower blade patent, to Haas under U.S. Pat. No. 4,083,166 (1978), uses a fairly complex combination of a centrally held disk type structure with an attachable bar cutting element. The centrally disposed disk features peripheral cutting elements which are up-turned, or angular to the disk flat, rendering them into axially functioning cutting edges. The intended use is again grass mulching and not radial cutting which appears not efficiently possible with this configuration. Also, a number of axially disposed flaps with angular cutting elements assist mulching. For brush work, however, their right angled dispositions to the cutting direction would produce a very exaggerated and unsuitable raking action. In any case, all these features are prominently inset from the radially projecting mountable bar cutter, which will again preclude effective interaction in much the same way as by the Barrera blade, already discussed above.

U.S. Pat. No. 3,482,380 to Stair (1969) presents a design with multiple bar type cutters radiating from a common hub and intended yet again for mowing. The device has, in effect, multiple flails working in concert from a common center. Serrated cutting edges present a novelty for some active axial ripping, but not for effective radial sawing of tree limbs, or sapling trunks.

U.S. Patent to Milbourn under U.S. Pat. No. 4,769,977 (1988) shows a disk structure with extremely rudimentary and poorly defined axial and radial cutting elements. This device is intended for very large and powerful machines capable of defoiliating and indeed debranching entire standing trees for harvest. Such operations are typically carried out at relatively low rotational speeds such as 200 to 400 RPM, but with application of great torque, to provide sufficient energy for the giant ripping actions. And since ripping and not smooth cutting is required, all cutting elements can be crude, provided, they are sufficiently strong.

By contrast, applications for high speed brush cutters, with engine speeds to 12 000 RPM and beyond, but relatively little torque, calls for a much greater degree of sophistication in blade design. The two field are really quite disparate, as moreover, powered brush cutters are highly mobile and human carried and operated. The need for light weight and very smooth and balanced operation is overriding, or the human operator would soon find the instrument onerous.

To help resolve some of the problems already described in the prior art, a very useful combined cutting an shredding blade was put forth by the applicant and awarded U.S. Pat. No. 5,361,570 (1994). The invention features an advanced combination of both axial and radial cutting elements, has outstanding efficiency in all directions of operation, as well as great smoothness. The operator is empowered to choose between saw cutting or shredding, as field conditions dictate to him at any given moment or circumstance.

The Bernardy blade allows the saw cutting of branches, heavy vines or small trees and also the efficient shredding of a large variety of grasses, weeds and of brush. On-site shredding has many advantages as it can create mulch to improve the soil, retard weed regrowth, or simply to make clean-up easier. Substantially shredded blackberry vines are much easier handled than prickly vines that have been simply cut. Burning and resulting air pollution can be reduced or eliminated and the use of toxic herbicides can be curtailed. The Bernardy blade can thus be beneficial to the environment and also a very efficient labor saving device.

However, while advancing blade design a significant step, the blade of U.S. Pat. No. 5,361,570, unfortunately also suffers from a number of defects, one of which is very serious, posing a safety risk to both operator and to bystanders and it is an objective of this application to correct and remedy the defects and to still further blade design another small but significant step.

In particular, the blade suffers the following disadvantages:

a) The design of the Axial Cutting Elements is based upon curved, triangular and perpendicularly protruding structures. These structures are separated one from the other longitudinally in their circular arrangement, thereby promoting a centrifugally enacted self-cleaning action between the structures. Unfortunately, nothing prevents adherence of moist, sticky, pulped plant debris to the Axial Cutting Elements themselves. In fact, their internally cupped shapes, in combination with their perpendicular or right angled position, serve to collect and compact debris under centrifugal forces.

b) Debris build-up on the Axial Cutting Elements can reach high enough to encroach into the serrations, leading to performance impairment.

c) Far more serious, however, and safety related, is another problem. Large, accumulated debris packets become unstable. Random interaction with cutting materials will then dislodge one or another of the debris packets. Since dislodging of all accumulated debris from each and every Axial Cutting Element practically never occurs simultaneously, a very violent vibration is induced from the sudden imbalance. High blade speeds excascerbate the problem, as both the vibration and potential for mischief grow with speed. There is also no warning to the operator who can easily be cought off guard—and experience momentary loss of control of a powered brush cutter operating at top speed. Serious injury may be a result.

d) Even without injury, the temporary imbalance and vibration is very inconvenient to the operator, who is obliged to interrupt his work, stop the motor, clear the blade of the remaining debris and then restart again. Moreover, the problem repeats itself, the work interruptions are unwelcome and the only alternative would be to stoically endure the vibrations—until the debris build-up on all Axial Cutting Elements has again 'naturally' equalized. However, even this is unsatisfactory, as the safety problem with its potential of injury is not removed.

e) The manufacturing process required to produce the Axial Cutting Elements with both a base curvature and a second longitudinal curvature is unnecessarily complex and uneconomical. Furthermore, this design requires elongation of the material through either high pressure cold forming or heat forming with associated distortion problems, to produce the desired geometry. Die costs and associated tooling costs are directly impacted by design complexity. Also, stretching of saw grade steel (the preferred material) is deleterious upon its grain structure.

f) Further, handling, packaging and storage problems are caused by the use of longitudinally cupped, perpendicularly projecting Axial Cutting Elements. This design makes convenient and space saving close cheek to joul stacking or nesting impossible and leads to cumbersome handling and additional packaging needs for shipping.

g) The relatively fine serrations of the Axial Cutting Elements provide very smooth, low kick-back (a strong torque reaction opposite to blade rotation upon striking any hard, substantial object) cutting. However, certain applications such as use on grasses, light weeds etc., can benefit from a more aggressive cutting action, as kick-back is unlikely to be produced under these conditions.

h) The base corners and relatively narrow interstices of the Axial Cutting Elements near their base structure, act as natural collection sites for pulped plant debris which becomes wedged and compacted into these spaces.

OBJECTS AND ADVANTAGES

Conversely, a number of objects and advantages of the present invention are:

a) To provide new structures for Axial Cutting Elements which are inherently self-cleaning—in addition to achieving a cleaning action between their elements.

b) To provide structures for Axial Cutting Elements which remain free from performance impairing, encroaching debris build-up and thereby achieve uninterrupted efficiency.

c) To provide structures for Axial Cutting Elements which pose no safety problems for either operator or bystanders.

d) To provide structures for Axial Cutting Elements which can be more economically manufactured and which are at the same time stronger than previous structures.

e) To provide structures for Axial Cutting Elements which allow convenient nesting of the blades, thereby contributing to savings during manufacture, handling, storage and shipping.

f) To provide structures for Axial Cutting Elements with a more aggressive cutting edge, particularly suitable for tall grasses, weeds and light brush.

g) To provide structure for Axial Cutting Elements which prevents the forward and rear stress relief holes and narrow interstices to serve as initial collection points for pulped plant debris.

h) To provide structure for Axial Cutting Elements without propensity to expose the single outermost tooth structure to undue wear, but instead to distribute such wear over several tooth structures, thereby increasing their service life.

i) To provide structures for Axial Cutting Elements which serve the role of carriers for replaceable tooth structures, thereby extending the service life of the blade.

j) To provide structure for Axial Cutting Elements which serve the role of carriers for replaceable tooth structures, thereby also allowing the use of specially hardened replaceable tooth structures, fitted to relatively soft, unhardened blade carrier material.

Still further objects and advantages will become apparent from a detailed consideration of the ensuing description and drawings.

BRIEF DESCRIPTION OF THE DRAWINGS

A fuller understanding of the present invention will be gained from the detailed description given herein below and from the accompanying drawings, which are by way of illustration only showing auxiliary axial cutting elements above the disk, while in practice, the disk is mounted with the elements below the disk and are not limitative of all variations possible within the scope and spirit of the invention and wherein.

REFERENCE NUMERALS IN DRAWINGS 10 peripheral border
12 radial cutting element
13 Axial Cutting Element, semielliptical
$13_a$ Axial Cutting Element, nested, bottom position
$13_b$ Axial Cutting Element, nested, 2nd pos. fr. bott.
$13_c$ Axial Cutting Element, nested, 3rd pos. fr. bott.
$13d$ material reserve, reclaim
14 void outline
$14_a$ void
15 serrations, Axial Cutting Element, typical
16 flats, Axial Cutting Elements, typical
17 first gullet, Axial Cutting Element 13
18 forward stress relief and debris clearance hole, typical
19 base line, Axial Cutting Elements, typical
20 center aperture, typical
21 blade center
22 offset or difference between 24 and 25, typical
$22_a$ rake angle, typical
23 rear stress relief and debris clearance hole, typical
24 distance from 21 to 18
25 distance from 21 to 23
26 disk
27 protrusion angle, Axial Cutting Element, typical
28 blade
$28_a$ blade, nested, bottom position
$28_b$ blade, nested, 2nd position from bottom
$28_c$ blade, nested, 3rd position from bottom
29 straight, forward cutting edge, Axial Cutting Element 39
$29_a$ straight, forward cutting edge, Axial cutting element 40
30 first serration, Axial Cutting Element 13
$30_a$ 2nd serration, Axial Cutting Element 13
$30_b$ 3rd serration, Axial Cutting Element 13
$30_c$ 4th serration, Axial Cutting Element 13
$30_d$ 5th serration, Axial Cutting Element 13
31 open spacing between Axial Cutting Elements, typical
32 direction of cut, Axial Cutting Element, typical
36 first serration, Axial Cutting Element 39
$36_a$ 2nd serration, Axial Cutting Element 39
$36_b$ 3rd serration, Axial Cutting Element 39
$36_c$ 4th serration, Axial Cutting Element 39
$36_d$ 5th serration, Axial Cutting Element 39
37 unserrated crown, Axial Cutting Element $40_a$
$37_a$ material reserve, corresponds with arc $37_b$
$37_b$ arc for alternate trailing body $40_a$
39 Axial Cutting Element, rectangular, serrated 39$_a$ trailing body 39
39$_b$ material reserve, Axial Cutting Element 39
40 Axial Cutting Element, rectangular, unserrated
40$_a$ Axial Cutting Element, sloping trailing body
40$_b$ material reserve, Axial Cutting Element 40
40$_c$ unserrated crown, Axial Cutting Element 40
41 tangent, minor axis, Axial Cutting Element 13
42 direction of ejected debris flow, typical
43 shreddings, momentarily lodged, typical
44 crown contact line, Axial Cutting Element 39
45 crown contact line, Axial Cutting Element 40
46 replaceable tooth
47 rivets
48 ramp, replaceable tooth
49 tooth crown, replaceable tooth
50 rivet holes, replaceable tooth
51 flat, replaceable tooth
53 rivet holes, Axial Cutting Element, replacable tooth tp.
54 Axial Cutting Element, replaceable tooth type
55 flat, Axial Cutting Element, replaceable tooth type
56 phantom lines for modular Axial Cutting Elements

SUMMARY

In accordance with the present invention, a rotary shredding blade having a circular disk member with auxiliary axially protruding cutting elements sloped toward the disk periphery at angles less than perpendicular and including differentiated structures. The outwardly sloping auxiliary cutting elements are effectively self-cleaning, whereby a serious safety problem is corrected and whereby the blade can be operated continuously and without need to manually remove collected debris from the Axial Cutting Elements.

DESCRIPTION OF THE INVENTION—FIGS. 1–9

The static physical structures of the present invention will now be described in detail with reference to the drawings.

Figure 1:
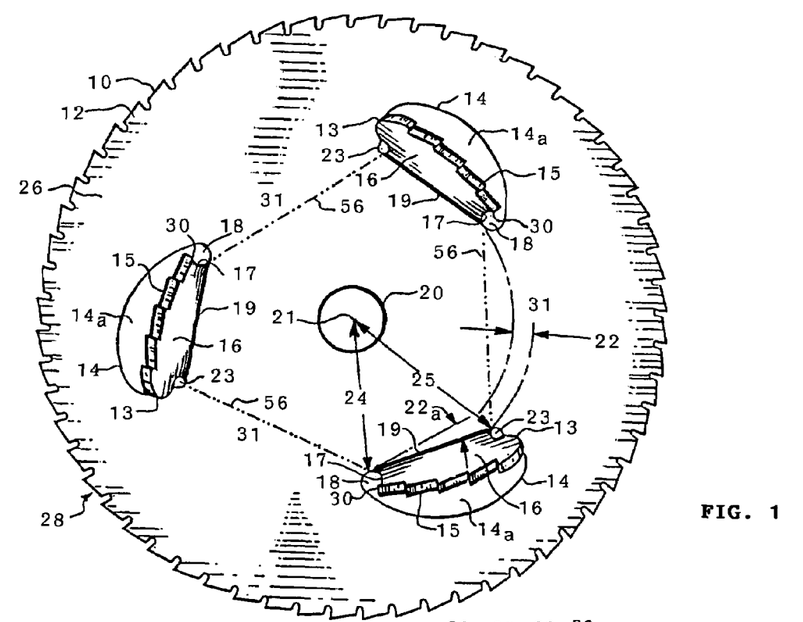
FIG. 1 is a full frontal view of the present invention, illustrating integrally formed Axial and Radial Cutting Elements.

A preferred embodiment of the blade 28 is illustrated in FIG. 1 (full frontal view). Disk 26 has peripheral, radial cutting elements 12. forwardly inclined Semielliptical Axial Cutting Elements 13 are symmetrically, equiangularly and circularly disposed with in-between spacing 31. Elements 13 have serrations 15 and are further inset some distance from disk periphery 10 and at distances 24 and 25 measured from blade center 21. The difference between distance 24 and 25 is shown at 22. This difference also yields a rake angle 22$_a$ for Axial Cutting Element 13.

Rake angle 22$_a$ is shown to be approximately 10°, but may be up to about 30°. The angle brings the first serration 30 of each Axial Cutting Element closest to blade center 21. Base line or angular junctures, 19 correspond to rake angle 22$_a$ and further give rise to Axial Cutting Elements which from an unsevered angular base line juncture, extend radially outward and conterminously with three sides severed and radially inward while deflected substantially in an axial direction. Base lines are nearer blade center 21, than are the serrations 15. The angle created by sloping Axial Cutting Elements outward is termed protrusion angle 27 with a range between approximately 45° and 80°. The preferred optimum is near 60°. Measurement of the angle is taken between disk flat 26 and Axial Cutting Element 13 from the blade periphery 10, as shown on FIG. 2.

Base lines 19 end in forward stress relief and debris clearance holes 18. Forward holes are about twice as large as rear holes 23, which are the terminus for the rear of base lines 19.

Axial Cutting Elements 13 have flat (or slightly convex, not shown), sides 16, shown on FIGS. 1, 4, 5, 6, 8, and 9 in top and profile views, clearly showing the fully raised structures.

Integral Axial Cutting Elements, formed from native material of a single component blade, correspond to void outlines 14 where the material was elevated from and also to voids 14$_a$. The forming process is facilitated by laser cutting of the precise outlines, then cold or hot forming through punch and die tooling, depending on the hardness state of the material chosen etc. Special attention must be given to the avoidance of crack formation and to appropriate heat treating, however, someone skilled in the art will not find the problems outside the range of normal industry experience. The forming process also creates the first gullet 17 for first serration 30, part of serrations 15 and the cutting edge of each Axial Cutting Element.

FIG. 1 also shows, in phantom outline 56, the shape of a typical modular Axial Cutting Element, incorporating Elements 13 or alternative configurations.

Figures 2, 3:
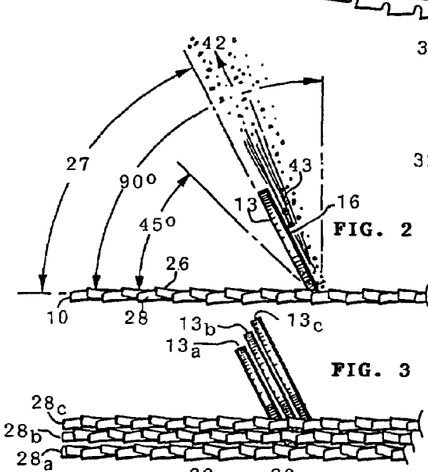
FIG. 2 is a partial side view of the present invention, illustrating the main protrusion angle of a typical Axial Cutting Element.
FIG. 3 is a partial side view of several blades of the present invention, illustrating close stacking or nesting.

FIG. 2 presents a side view of shredded plant debris 43, momentarily frozen in position against the inside flat 16 of an Axial Cutting Element and with an indication of the path of debris ejection into direction 42.

FIG. 3 illustrates nesting. Blades 28$_a$, 28$_b$ and 28$_c$ are shown closely stacked with their respective Axial Cutting Elements 13$_a$, 13$_b$ and 13$_c$ protruding through voids 14$_a$ (not shown), common to all blades.

Figure 4:
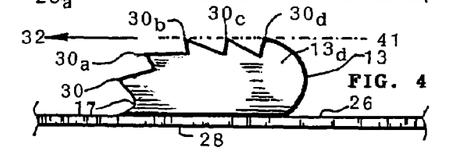
FIG. 4 is a full profile view of an Axial Cutting Element of semielliptical, serrated configuration.

FIG. 4 shows a semielliptical Axial Cutting Element 13 in fully elevated profile, supported by disk 26. This particular embodiment is only one of many configurations possible. The outline is patterned to simulate an elliptical curvature above the major axis and has a moderate deflection at the minor axis. Leading inclined serrations begin with gullet 17, lead to first serration 30, second serration 30$_a$, third serration 30$_b$, fourth serration 30$_c$ and fifth serration 30$_d$. A materials reserve 13$_d$ is at the rear of the Axial Cutting Element. Broken line 41 parallels the outermost tooth structures, represented by serrations 30$_b$, 30$_c$ and 30$_d$. Arrow 32 indicates the direction of cutting engagement. The actual tooth structures may be varied in both geometric detail and in number.

Figures 5, 6, 7, 8:
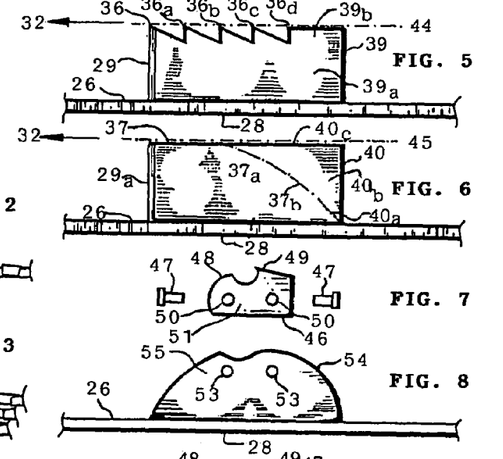
FIG. 5 is a full profile view of an Axial Cutting Element of rectangular, serrated, configuration, with a single forward cutting edge.
FIG. 6 is a full profile view of an Axial Cutting Element of rectangular, unserrated configuration, with a single forward cutting edge and also of an alternative rear support structure of arcuate configuration.
FIG. 7 is a full profile view of a replaceable tooth structure and the fastening rivets.
FIG. 8 is a full profile view of an Axial Cutting Element designed to receive a replaceable tooth structure.

FIG. 5 shows rectangular Axial Cutting Element 39 in full profile view, elevated from disk 26. Single, straight forward cutting edge 29, is complemented by crown serrations 36, 36$_a$, 36$_b$, 36$_c$ and 36$_d$. Again, both geometric detail and number of these serrations may be altered. A materials reserve 39$_b$ is provided. Trailing body 39$_a$ supports reserve structure 39$_b$. Broken line 44 parallels the outermost structures of the crown serrations.

FIG. 6 is a full profile view of either a rectangular or an arcuate Axial Cutting Element. A single, forward, straight cutting edge 29$_a$ has no complementary crown serrations and serves two alternative embodiments. One of these is fully rectangular 40, but can be modified to become 40$_a$, through application of arc 37$_b$, thereby defining a sloped away trailing structure. Material reserves are provided at 37$_a$ and at 40$_b$ for element 40$_a$ and element 40, respectively. Broken line 45 parallels unserrated crowns 37 and 40$_c$, integral to Axial Cutting Elements 40$_a$ and 40, respectively.

FIG. 7 is a full profile view of a typical replaceable tooth 46 with mounting apertures 50 for fastening. The tooth structure is flat on its side 51 (as well as on its other side, not shown), has ramp 48 and crown 49. Fastening rivets 47 correspond to mounting apertures 50.

FIG. 8 is a full profile view of Axial Cutting Element 54, curved to adopt a replaceable tooth structure, having flat 55, mounting apertures 53 and an unserrated, outwardly sloping (not shown) structure.

Figure 9:
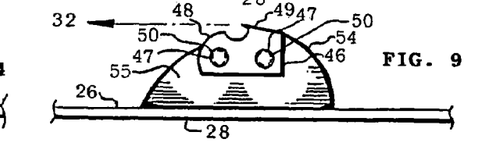
FIG. 9 is a full profile view of an Axial Cutting Element with a replaceable tooth structure attached.

FIG. 9 is a full profile view of an Axial Cutting Element 54 with attached tooth structure 46. Attachement can be through rivets 47, passed through apertures 53 of the Axial Cutting Element 54 and holes 50 of replaceable tooth 46. Ramp 48 forms an integral part of replaceable tooth 46, as does crown 49. Axial Cutting Element flat 55 facilitates flush mounting of flat 51 of the replaceable tooth, which has a parallel flat (not shown) on its opposite side.

From the foregone description a number of advantages become evident:

a) Axial Cutting Elements with a substantial flare or slope outward from the inner portion of the blade flat toward the blade periphery, provide a natural pathway for cuttings and plant debris, as it is urged up and outward by centrifugal forces. This action prevents debris build-up. Self-cleaning Axial Cutting Elements no longer collect debris packets, no longer have problems of eneven weight distribution of accumulated debris and no longer suffer vibration problems. The Axial Cutting Elements stay clean and balanced. Therefore, sudden violent vibrations can no longer occur and loss of control, leading to potential injury, is eliminated.

b) Axial Cutting Elements arising from a base line radially inclined inward from trailing end to leading end, benefit from a substantial raking action which enhances shredding efficiency.

c) Axial Cutting Elements with flat even, bilaterally unobstructed structures facilitate debris shedding, thereby contributing to a self-cleaning action.

d) Axial Cutting Elements with flat sides pose reduced tooling problems, entail energy savings, during manufacturing.

e) Outwardly sloping Axial Cutting Elements facilitate close quarter nesting, thereby entailing further economies in handling, storage and shipping.

f) Circularly and symmetrically disposed Axial Cutting Elements promote an inherent blade balance and during high speed operation also enact consecutively effective cutting engagements for maximum efficiency.

g) The use of flat instead of longitudinally curved structures for Axial Cutting Elements provides stronger final structures, as the simple angular bend required along the base line, leaves the remainder of the Element without deformation. This contrasts sharply to the prior compound curvature required, which necessitated elongation of certain portion of the material.

h) Flat Axial Cutting Elements are efficiently reclaimed. Incremental adjustments to follow the previous compound curvature are no longer needed.

i) Shredding aggressiveness can be dramatically influenced by Axial Cutting Element configuration. Thus, a serrated, semielliptical structure provides smooth, low kick back (strong torque reaction, opposite to blade rotation and caused by striking substantial, hard object) performance, very suitable for heavy brush work. Also, if wear is equalized on the outermost tooth structure by depressing the minor axis of the elliptical shape, then longevity or service life of the angular cutting edges can be increased.

j) A substantially more aggressive cutting action, suitable for a mix of heavy weeds and light brush, can be achieved with Axial Cutting Elements having a single forward cutting edge and additional crown serrations.

k) A very simple rectangular structure without crown serrations but with a single forward cutting edge poses the least complex manufacturing problems, is easily reclaimed and suitable for grasses and weeds, where kick back is not an important consideration.

l) Axial Cutting Elements can further be fitted with replaceable tooth structures. After excessive wear, these can then be exchanged for new ones, dramatically extending the service life of the blade, relegated to a mere cutting elements carrier role (particularly, the case if all peripheral cutting elements are also made replaceable, not shown in drawings). An additional benefit is gained from modulating kick back propensity as cutting depth can be easily controlled by changes in tooth ramp hights.

m) Axial Cutting Elements of any configuration can be made modular with a connecting planar structure embodiment (phantom lines 56 of FIG. 1), by applying similar design principles already advanced. A primary advantage to modular auxiliary cutting elements is the opportunity afforded, to mix and match auxiliary with conventional radial cutting elements of very different aggressiveness, allowing customized adaptation to particular field requirements. Very easy field exchange becomes also possible, as modular elements are simply mounted onto an appropriate conventional saw blade in piggy-back fashion. This is also useful if reclaiming of only one or the other blade becomes necessary, as only that particular blade need be exchanged, leaving the still serviceable component in place.

OPERATION OF THE INVENTION

Mounting—FIG. 1

Mounting of the blade is completely conventional. The blade is attached to the driven arbor with an underlying mounting boss via a blade washer, a lock washer and a threaded nut. Some brush cutter arbors are equipped with an apperture to take a cotter pin for the nut.

The blade has an appropriately sized arbor hole 20 to serve mounting. This mounting arrangement is not dependant on keyway and key for secure mounting, but instead relies on a friction assembly. The method is almost universal, allows for some blade creep during hard rotational impacts, which is protective of both blade and drive system.

The Axial Cutting Elements 13, integrally formed or modularly attached, are always mounted to point away from the drive assembly and toward the vegetation or the general ground direction, as the case may be.

Self-Cleaning Feature—FIGS. 1–9

The blade of the present invention is effectively self-cleaning, which is of crucial importance. The self-cleaning feature stops build-up of debris packets on Axial Cutting Elements. The sudded, uneven dislodging of debris and the associated, uncontrolled vibration with its inherent safety risk to the operator, is thereby eliminated.

To achieve effective self-cleaning, an interplay of special structural features of the Axial Cutting Elements and centrifugal forces is used. As seen on FIG. 1, the blade 28 has a flat surface 26 with several Axial Cutting Elements 13 integrally formed from blade stock and projecting away from surface 26, beginning at base lines 19, which feature a small curvature (not illustrated) between blade flat 26 and the body of the Axial Cutting Element 16, also flat. The curvature, or radius of the base lines 19 provides the transition from blade flat 26 to Axial Cutting Element flat 16. It further determines the angle of the Axial Cutting Elements which flare outward from the inset base lines 19 and slope poward the blade periphery 10.

It is the outward flare or slope of the Axial Cutting Elements toward the blade periphery, in conjunction with their flat structures, which then enables centrifugal forces to urge shredded plant debris up and outward to be expelled, as illustrated by FIG. 2.

This result was entirely new and unexpected. Accordingly, shreddings 43, which are only momentarily lodged against the sloping Axial Cutting Elements 13, are driven into direction of arrow 42. The optimal angle for the Elements to facilitate this process and yet still allow sufficiently aggressive protrusion into work directions, has been determined to be less than 90°, but more than 45°, or optimally about 60°.

An enhancement for both the self-cleaning mechanism and shredding efficiency is based on an additional structural detail. FIG. 1 shows that the Axial Cutting Element base line 19 is in each instance somewhat tilted toward the center of the blade, 21. This is accomplished by shortening the distance 24 between the blade center 21 and the leading point at 18, while relatively lenghtening the distance 25 between the blade center 21 and the trailing point at 23. This base line tilt, or rake, is seen at arrows 22 and 22$_a$. The operational effect of raking the Axial Cutting Elements with their leading point poward the center of the blade is actually threefold: First, this additional angle aids the debris clearing feature by facilitating egress of shreddings toward the rear of Elements 13. A second advantage was found to be completely new and unexpected. Accordingly, the angle also significantly improves shredding efficiency. Each serration 15 no longer follows precisely in the path of the preceeding serration, but instead each separate serration now also takes a separate, slightly staggered cut of new material during rapid rotation.

A last advantage relates to conventional saw cutting, or radial cutting with the flat blade portion 26, with peripheral cutting elements 12 at 10. During radial cutting, the practical cutting depth possible is determined by the disposition of the Axial Cutting Elements which form a natural cutting depth limiting device. The radial cut can only progress as deeply as the margin available between the blade periphery 10 and the inset Axial Cutting Elements, which will contact the material being cut. The rake angle enables this contact to take place without hooking or snagging, as it keeps the serrations out of harm's way, pointing them inward.

Further structural detail contributing to the self-cleaning feature of the blade relate to the semicircular forward stress relief and debris clearing holes 18. These openings serve as terminus for base lines 19 and void outlines 14, in addition to the first serrations 30. Generously sized openings 18 funnel debris into voids 14$_a$, for prompt dispersal.

Semicircular rear stress relief and debris clearance holes 23 serve somewhat diminished, but similar functions. Their size is only approximately 50%, relative to their leading counterparts and actually little debris enters them because of the superimposed trailing body structure of the Axial Cutting Elements, which provide effective shielding. Their role is nonetheless important because they supply the transitional structure between the trailing end of the base lines 19 and the void outlines 14.

A number of alternative Axial Cutting Element structures can fulfill the important requirement to be self-cleaning. Examples are provided on FIGS. 4, 5, 6, 8, and 9. The structures all share essentially flat (or even slightly concave, not shown) configurations and when disposed on blade disk members, are centrally inclined with their base lines and outwardly flared or sloped toward the blade periphery from inset locations.

Nesting Feature—FIGS. 1, 2 and 3

Convenient, efficient and spacesaving handling of blades during manufacturing, storing and shipping requires close quarter stacking, or nesting. Nesting of blades with Axial Cutting Elements was previously not possible due largely to the perpendicularly disposed Axial Cutting Elements which directly interfered with one another during stacking. The problem was resolved through two design innovations which are already familiar: FIG. 1 shows a blade with integrally formed Axial Cutting Elements, flat and also flared outward toward the periphery from blade center—and having created voids 14$_a$ from the diplaced native material. FIG. 2 further shows the flare toward the blade periphery. These structural features now allow close quarter nesting without interference. Axial Cutting Elements from any one blade can protrude into the corresponding voids of any other flat laid nearby blade for a convenient vertically stacked close fit. The process is illustrated at FIG. 3, with three nested blades, where Axial Cutting Element 13$_a$ corresponds to blade 28$_a$, Element 13$_b$ corresponds to blade 28$_b$ and similarly, Element 13$_c$ relates to blade 28$_c$. In this fashion, any number of blades are nestable, including modular Axial Cutting Elements (except there would be no protrusion, only separately stacked modular elements).

Alternative Structures for Axial Cutting Elements—FIGS. 4–9

To satisfy needs posed by very different field conditions for cutting elements to be more, or less aggressive, a number of alternative structures have been developed and will now be presented.

FIG. 4 shows a semielliptical Axial Cutting Element designed for very smooth, low kick back shredding, which is accomplished through a number of evenly distributed serrations 30, 30$_a$, 30$_b$, 30$_c$ and 30$_d$. Noteworthy is the imaginary line 41, parallel to serrations 30$_b$, 30$_c$ and 30$_d$. This detail contributes to essentially equalized wear to several key serrations, thereby enhancing their service span. Material reserve 13$_d$ serves for reclaiming. The large gullet at 17 serves to raise the lowest serration 30 into an effective cutting position. Cutting direction is indicated by arrow 32 and is typical for all Axial Cutting Elements subsequently described and depicted. The semielliptic embodiment is also used in the complete frontal illustration of FIG. 1. Optimal application of this design is for heavy brush work.

FIG. 5 represents a rectangular configuration 39 with a single frontal cutting edge 29 and crown serrations 36, 36$_a$, 36$_b$, 36$_c$ and 36$_d$. Since the crown serrations are all parallel to a single line 44, they will provide largely equalized wear and longevity. This particular embodiment has the further advantage that dulling of either the crown serrations, or of the single frontal cutting edge alone, still leaves the Axial Cutting Elements functional. A material reserve at 39$_b$ is for reclaiming. This configuration is best used in light brush, but will also serve well for tall weeds and grasses, where kick back is of less concern than in heavy brush conditions.

FIG. 6 presents the simplest design possible to serve Axial Cutting Elements and has the form of unserrated rectangle 40. There is a single forward and straight (hook may be applied, either positive or negative) cutting edge 29$_a$ and a straight crown 37, parallel to line 45.

The rectangle may be sloped down to the rear at dotted line 37$_b$, or left intact with a large material reserve 40$_b$, for reclaiming.

A key point favoring this design is its exceptional economy of manufacture and related ease of reclaiming. Proper application in the field is for tall grasses and weeds, where kick back considerations are only minimal.

FIGS. 7, 8 and 9 relate to structures for Axial Cutting Elements with a replaceable tooth system. Replaceable tooth 46 has crown 49 and an incorporated cutting edge. Ramp 48 serves to limit cutting depth and promote exceptional smooth, low kick back cutting. The tooth is attached with rivets 47, fed through holes 50. The flat 51 of the tooth corresponds to flat 55 of Axial Cutting Element 54, now assigned a carrier role and elevating one or more replaceable teeth into proper position. Axial Cutting Element 54 has adapted round contours and mounting holes 53 for this purpose.

FIG. 9 shows a complete assembly with Axial Cutting Element 54 protruding from disk flat 26 of blade 28.

Because of its extremely low kick back propensity, the replaceable tooth embodiment blade is most suitable for very heavy duty, dense brush work. Worn out teeth are conveniently replaced, extending service life of the blade indefinetely (particularly so, if peripheral cutting teeth are also made replaceable, not shown).

CONCLUSIONS, RAMIFICATIONS AND SCOPE

Thus the reader can readily see that the flat, unobstructed Axial Cutting Elements with their centrally inclined base lines and flare outward toward the blade periphery, can enact a very effective self-cleaning action as centrifugal forces urge shredded debris up and away from the blade. This efficient mechanism prevents debris collection on the Axial Cutting Elements and completely resolves the problem of sudden, uncontrolled vibration and the associated safety problem of operator loss of control. In addition, the novel Axial Cutting Elements have the following new advantages, in that:

they provide significant savings in manufacturing, due to simplified tooling and reduced energy consumption, central inclination of their base lines, increases shredding efficiency due to a raking action. The inclination, in addition, supports the self-cleaning function, outwardly flaring of the integrally formed or modular Axial Cutting Elements at an acute angle toward the blade periphery allows the blades to be closely nested. Nesting offers savings during the entire manufacturing, storage and shipping cycle, they provide stronger structures as the material of choice (high carbon saw steel) needs no longer be deformed to create compound curvatures. Distortion problems during heat treating are further minimized, flat Axial Cutting Elements simplify and economize reclaiming, existing shop equipment is more easily adapted, they are easily adaptable for different tooth configurations, tailored to fit specific field conditions, ranging from grasses and light weeds to very heavy, dense brush with saplings and tree branching. A novel system of replaceable tooth structures is an additionally useful development.

Even though many specificities are detailed in the above description, these should not be construed to be limitative of the scope of the invention, but only as providing illustrative examples of certain presently preferred embodiments of this invention. Many additional configurations are still possible.

Also, the number of Axial Cutting Elements may be reduced to just two opposing elements (theoretically, even just one, properly counterbalanced). Also too, the number and detailed geometry of the serrations on the Axial Cutting Elements can be modified. Of particular influence on cutting aggressiveness are hook angles. Further, the relative dimensions may be changed and the present material of choice be exchanged for other suitable substances. It is further possible that for an injection molded process a suitable metal impregnated elastomer of sufficient wear quality, may be economically used, resulting in a cheap use and throw-away blade for light duty work.

Therefore, the scope of the present invention should not be determined by the specific examples and minute details provided, but rather by the appended claims and their legal equivalents.

I claim:

1. A rotary brush cutting and shredding blade for mounting to driven shaft of motorized brush cutter, comprising:

a circular disk member constituting bilateral planes and having both top and bottom sides circumscribed by a peripheral border, with serrated cutting elements disposed on said peripheral border in a direction of rotation of said disk member for cutting, and a center aperture for mounting of said disk member to said driven shaft with the top side adapted to face toward the upper continuous extend of said driven shaft and the bottom side adapted to face away from the lower terminus of said driven shaft, for urging circular movement of said disk member in the disposed direction of rotation;

at least one auxiliary cutting means extending below said disk when mounted to said shaft and having an unsevered angular juncture with the disk member and having three sides severed, and said auxiliary cutting means located radially outward of said central aperture position and radially inward of said peripheral border, said auxiliary cutting means deflected substantially out of the plane of said bottom side of said planar disk member;

each said auxiliary cutting means including structures having predetermined surface configurations, whereby adherence of debris is impeded and shedding of debris is urged by centrifugal forces and manufacturing is simplified and economized, and said unsevered angular junctures oriented lengthwise into the direction of rotation, whereby said auxiliary cutting means are made impact resistant and strengthened, and whereby said auxiliary cutting means provide both axial and radial cutting and shredding capabilities.

2. A rotary brush cutting and shredding blade as defined in claim 1 further including said auxiliary cutting means three or fewer in number, symmetrically, equiangularly and circularly disposed, whereby an inherently natural balance is achieved and whereby each of said auxiliary cutting means follows in the path of the proceeding one during rotation to deepen the cut and to provide enhanced shredding, and where a smooth surface is provided between said auxiliary cutting means to provide for unobstructed debris clearing.

3. A rotary brush cutting and shredding blade as defined in claim 1 further including said unsevered angular juncture radially inclined inward from a trailing end to a leading end of each said auxiliary cutting means, whereby both a raking and an enhanced shredding and debris clearing action is provided, as centrifugal forces urge debris from said leading end toward said trailing end of the angular juncture for final ejection, and whereby snagging is precluded during radial cutting.

4. A rotary brush cutting and shredding blade as defined in claim 1, wherein each said auxiliary cutting means includes a predetermined, corresponding void therein, positioned radially outward of the unsevered juncture, whereby debris collection is precluded and whereby close blade nesting by vertical stacking of multiple blades is provided as each auxiliary cutting means of each said blade in a lower flat laid position can protrude upwards into said voids of several stacked blades in an upper flat laid position immediately adjacent to and above, or if positioned conversely, whereby each said auxiliary cutting means of each blade in an upper flat laid position can protrude downward into said voids of several stacked blades in a lower flat laid position immediately adjacent to and below, whereby convenient nesting is provided for efficient handling, packaging, shipping and storage.

5. A rotary brush cutting and shredding blade as defined in claim 1, wherein each said auxiliary cutting means further includes substantial, semicircular stress relief and debris clearing aperture at both a leading and trailing end of said auxiliary cutting means, wherein said aperture at said leading end is substantially larger than the aperture at the trailing end.

6. A rotary brush cutting and shredding blade as defined in claim 1, wherein each said auxiliary cutting means has a serrated, substantially semi elliptical structure with a depressed minor axis, wherein a crown height of at least two of said serrations is equal and a line connecting said crown heights is parallel with the bottom surface as seen from disk edge view, whereby equalized wear is provided on said serrations, service life is extended and exceptionally smooth cutting in heavy brush applications is accomplished.

7. A rotary brush cutting and shredding blade as defined in claim 1, wherein each said auxiliary cutting means has a rectangular structure having a forward straight cutting edge and an upper serrated cutting edge connected to and extending perpendicular to said forward cutting edge, whereby excessive wear of only said forward cutting edge does not preclude effective continued service through said upper serrated cutting edge and whereby excessive wear of only said upper cutting edge of said auxiliary cutting edge does not preclude continued service through said forward straight cutting edge of each said auxiliary cutting means.

8. A rotary brush cutting and shredding blade defined in claim 1, wherein each said auxiliary cutting means has an unserrated, rectangular structure with a single forward cutting edge for cutting and shredding grasses and weeds.

9. A rotary brush cutting and shredding blade as defined in claim 1, wherein each said auxiliary cutting means has a substantial materials reserve at the rearward portion thereof whereby during use and repeated sharpening, said cutting edges are permitted to gradually and progressively wear, and whereby the material reserve provides useful and extended service life of said auxiliary cutting means.

10. A rotary brush cutting and shredding blade for mounting to driven shaft of motorized brush cutter, comprising:
 a circular disk member constituting bilateral planes and having both top and bottom sides circumscribed by a peripheral border, with serrated cutting elements disposed on said peripheral border in a rotational direction of said disk member for cutting, and a center aperture for mounting of said disk member to said driven shaft, with the top side adapted to face toward the upper continuous extend of said driven shaft and the bottom side adapted to face away from the lower terminus of said driven shaft, for urging circular propulsion of said disk member in the disposed direction of rotation;
 at least one auxiliary cutting means extending below said disk when mounted to said shaft and having an unsevered angular juncture with the disk member and having three sides severed, and said auxiliary cutting means extending radially outward of the center aperture position and radially inward of said peripheral border, said auxiliary cutting means deflected substantially out of the plane of said bottom side of said planar disk member;
 each said auxiliary cutting means including mounting means to receive individual, replaceable cutting elements, whereby upon undue wear or field damage, said cutting elements can be replaced as required and whereby the service life of said circular disk member and said auxiliary cutting means are indefinitely extended;
 each said auxiliary cutting means also including structures having predetermined surface configurations, whereby adherence of debris is impeded and shedding of debris is facilitated through centrifugal forces and whereby manufacturing is simplified and economized, and said unsevered angular structures oriented lengthwise into the direction of rotation, whereby said auxiliary cutting means are made impact resistant and strengthened, and whereby said auxiliary cutting means provide both axial and radial cutting and shredding capabilities.

11. The blade as defined in claim 10 further including said auxiliary cutting means three or fewer in number, symmetrically, equiangularly and circularly disposed, whereby an inherently natural balance is achieved and whereby each of said auxiliary cutting means follows substantially in the path of the preceding one during rotation, to deepen the cut and to provide enhanced shredding.

12. The blade as defined in claim 10 further including said unsevered angular juncture radially inclined inward from a trailing end to a leading end, of each auxiliary cutting means, whereby both a raking action and an enhanced cutting and debris clearing action are provided, as centrifugal forces urge debris from said leading end toward said trailing end of said unsevered angular juncture for final ejection.

13. The blade as defined in claim 10, wherein each said auxiliary cutting means further includes a predetermined, corresponding void therein, positioned radially outward of the unsevered juncture, whereby debris collection is precluded and, whereby close blade nesting by vertical stacking of multiple blades is provided as each said auxiliary cutting means of each blade in a lower flat laid position can protrude upwards into the said voids of several stacked blades in an upper flat laid position immediately adjacent to and above, or if positioned conversely, whereby each said auxiliary cutting means of each blade in an upper flat laid position can protrude downward into said voids of several stacked blades in a lower flat laid position immediately adjacent to and below and whereby convenient nesting is provided for efficient handling, packaging shipping and storage.

14. The blade as defined in claim 10, wherein each said auxiliary cutting means further includes stress relief and debris clearing aperture at the leading and trailing end of said auxiliary cutting means, wherein said aperture at said leading end is substantially larger than the aperture at the trailing end.

15. The blade as defined in claim 10 wherein each said replaceable cutting element has a ramp structure followed by a recess and at least one cutting tooth in successive order and wherein the crown of said ramp structure is located at substantially lesser distance from the bottom surface of said disk than the crown of said at least one cutting tooth, whereby the differential serves to define maximum cutting depth of said replaceable cutting element and whereby hazardous torque and kick back reaction is minimized.

16. A brush cutting blade for mounting to a drive shaft manipulated by a handle, said brush blade comprising:

a circular disk having a disk body defining a plane and having top and bottom sides and a peripheral edge, teeth formed on the peripheral edge and defining a direction of rotation of the disk for cutting, and a center mount for mounting the disk to the drive shaft with the top side facing the handle for rotatively driving the disk in the defined direction of rotation;

at least one cutting segment formed out of the disk body positioned radially outward of the center mount and radially inward of the peripheral edge, said segment having a generally curved triangular shape with three sides, one side being unsevered and forming a juncture with the disk body and the other sides extending from said one side radially outward of the center mount severed from the disk body, said segment deflected outwardly of the plane of the disk body toward the bottom side of the disk body at an angled orientation relative to the disk body between positions of co-planar and normal relative to the plane of the disk body and forming thereby an opening through the disk body that is radially outwardly of the juncture;

said segment having an inclined leading edge with cutting teeth on the edge for cutting in the direction of the rotation and as a result of the angular orientation of the blades, said teeth presenting laterally extended cutting section from a face view and laterally extended cutting section from an edge view of the disk.

17. A brush cutting blade as defined in claim 16, wherein at least three segments are provided in said disk body, and said juncture inclined from trailing end to leading end radially inward.

18. A brush cutting blade as defined in claim 16, wherein multiple segments are provided symmetrically around the disk body, the segments deflected outwardly at a similar angle between approximately 45° and 80°.

* * * * *